United States Patent [19]
Flynn

[11] Patent Number: 5,455,474
[45] Date of Patent: Oct. 3, 1995

[54] MAGNETIC MOTOR CONSTRUCTION

[75] Inventor: Charles J. Flynn, Kansas City, Mo.

[73] Assignee: Magnetic Revolutions Limited L.L.C., St. Louis, Mo.

[21] Appl. No.: 902,952

[22] Filed: Jun. 23, 1992

[51] Int. Cl.⁶ .............................. H02K 1/17; H02K 1/27; H02K 11/00; H02K 29/10
[52] U.S. Cl. ........................... 310/181; 310/152; 310/154; 310/156; 310/268; 310/68 B
[58] Field of Search ................................ 310/68 B, 152, 310/154, 156, 181, 268; 335/126, 131, 272; 318/254

[56] References Cited

U.S. PATENT DOCUMENTS

| | | | |
|---|---|---|---|
| 3,096,467 | 7/1963 | Angus et al. | 318/138 |
| 3,569,806 | 3/1971 | Brailsford | 318/254 |
| 3,670,189 | 6/1972 | Monroe | 310/181 |
| 3,796,039 | 3/1974 | Lucien | 310/268 |
| 3,883,633 | 5/1975 | Kohler | 310/152 |
| 4,151,431 | 4/1979 | Johnson | 310/12 |
| 4,187,441 | 2/1980 | Oney | 310/112 |
| 4,758,756 | 7/1988 | Pouillange | 310/152 |
| 4,875,110 | 10/1989 | Kazama et al. | 310/268 |
| 4,972,112 | 11/1990 | Kim | 310/181 |
| 5,179,307 | 1/1993 | Porter | 310/268 |

FOREIGN PATENT DOCUMENTS

| | | | |
|---|---|---|---|
| 210005 | 7/1960 | Germany | 310/181 |
| 0025153 | 2/1982 | Japan | 310/181 |
| 01521078 | 9/1982 | Japan | 310/152 |
| 0002840 | 1/1987 | Japan | 310/152 |

*Primary Examiner*—Clayton E. LaBalle
*Attorney, Agent, or Firm*—Haverstock, Garrett & Roberts

[57] ABSTRACT

The present invention relates to an apparatus having spaced permanent magnets positioned so that there is magnetic interaction between them, and controlling the interaction by having a coil in the space between the permanent magnets connected to a source of electric potential and a controllable switch in series such that closing the switch places a voltage across the coil and predeterminately affects the magnetic interaction between the spaced permanent magnets. The invention also teaches mounting one of the permanent magnets on a rotatable structure so that the spaced permanent magnets can move relative to each other, the controllable switch operating to control the application of electric potential across the coil in such a manner as to produce relative rotational movement between the spaced permanent magnets.

25 Claims, 7 Drawing Sheets

MAGNETIC MOTOR CONSTRUCTION

BACKGROUND OF THE INVENTION

The present invention is an improvement over the inventions disclosed in Flynn et al and Flynn pending patent applications Ser. Nos. 07/322,121 and 07/828,703, filed Mar. 13, 1988 and Jan. 31, 1992 respectively. The devices disclosed in the pending applications relate to means to produce useful energy using permanent magnets as the driving source. This is also true of the present invention which represents an important improvement over the known constructions and one which is simpler to construct, can be made to be self starting, is easier to adjust, and is less likely to get out of adjustment. The present construction is also relatively easy to control, is relatively stable and produces an amazing amount of output energy considering the source of driving energy that is used. The present construction, like the constructions disclose in the earlier applications, makes use of permanent magnets as the source of driving energy but teaches a novel means of controlling the magnetic interaction or coupling between the magnet members and in a manner which is relatively rugged, produces a substantial amount of output energy and torque, and in a device capable of being used to generate substantial amounts of energy that is useful for many different purposes.

The present invention resides in a fixed support structure having one or more fixed permanent magnets such as an annular permanent magnet mounted thereon with the pole faces of the permanent magnet located adjacent opposite faces thereof. The device has one or a plurality of relatively flat coils arranged in a coplanar manner about the periphery on one of the opposite faces of the fixed permanent magnet, and it has means for journaling a shaft member that extends through the permanent magnet with one or more other permanent magnet members attached thereto at spaced locations, each of the one or more spaced magnets having one of its magnetic poles positioned adjacent to the fixed permanent magnet with the plane of the coils positioned therebetween, the spaced permanent magnets and the fixed permanent magnet having their polarities arranged to produce a magnetic interaction such as magnetic coupling or magnetic repulsion therebetween. The device also includes journal means for supporting the shaft member and the spaced permanent magnet members for rotation relative to the fixed magnet and to the coils thereon, and means for selectively and sequentially energizing the coils located in a plane or space between fixed and movable magnets to predeterminately control the magnetic interaction forces between the respective spaced permanent magnet members and the fixed magnet in such a manner as to produce relative rotation therebetween. Various means can be used to control the application of energy to the coils including timer means under control of means mounted on the shaft for rotation therewith and a source of energy. The present construction can be made to be self starting or to be started with some initial help to establish rotation.

OBJECTS OF THE INVENTION

It is a principal object of the present invention to teach the construction and operation of a relatively simple, motor-like device using permanent magnets in an unique manner to generate rotational or other forms of movement.

Another object is to teach the construction and operation of a relatively simple, motor-like device having novel means for coupling and/or decoupling relatively moveable permanent magnets to produce motion.

Another object is to provide novel means for controlling the coupling and decoupling of relatively moveable permanent magnets.

Another object is to make the generation of rotational energy less expensive and more reliable.

Another object is to teach a novel way of generating energy by varying magnetic interaction forces between permanent magnets.

Another object is to provide an inexpensive way of producing energy.

Another object is to provide a substitute source of energy for use in places where conventional motors, generators and engines are used.

These and other objects and advantages of the present invention will become apparent after considering the following detailed specification of preferred embodiments in conjunction with the accompanying drawings.

DETAILED DESCRIPTION OF THE PREFERRED EMBODIMENTS

Figure 1:
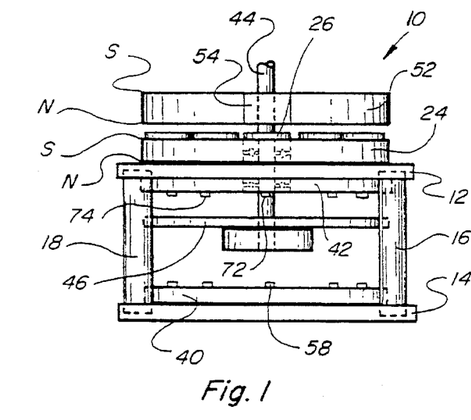
FIG. 1 is a side elevational view of a magnetically powered device constructed according to the present invention.

Referring to the drawings more particularly by reference numbers, number 10 refers to a device constructed according to the present invention. The device 10 includes a stationary base structure including an upper plate member 12, a lower plate member 14, and spaced posts 16–22 connected therebetween. Mounted on the upper plate 12 is a fixed permanent magnet member 24 shown annular in shape which has one of its poles (its North pole) adjacent the upper surface thereof and its opposite pole (its South pole) spaced above the plate 12.

Figure 2:
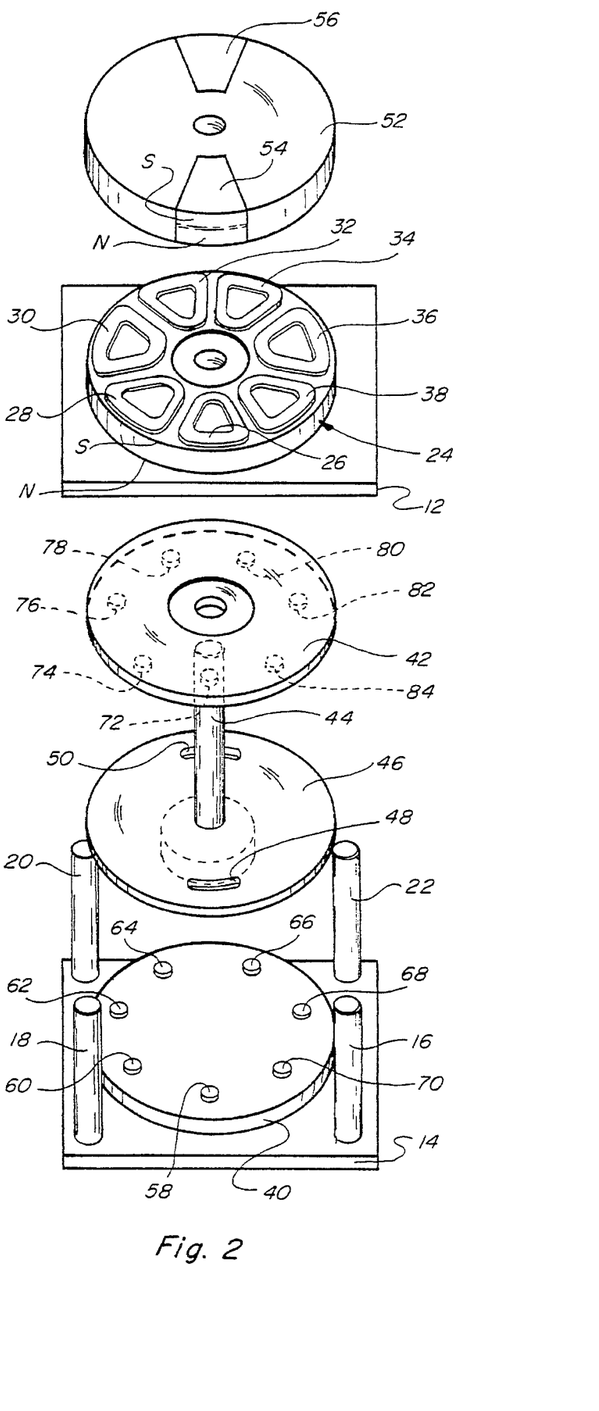
FIG. 2 is an exploded view of the device shown in FIG. 1.

Referring to FIG. 2, the permanent magnet member 24 is shown having a plurality of coils 26–38 mounted in a coplanar relationship on the upper surface thereof. Seven coils are shown, and the coils 26–38 have electrical connections made through the plate 12 to other circuit members which will be described later in connection with FIG. 13. Another member 40 is mounted on the upper surface of the lower plate 14 and a similar member 42 is mounted on the underside of the plate 12.

A shaft 44, (shown oriented vertically for convenience) extends through aligned bores in the members 42, 12 and 24. The lower end of the shaft 44 is connected to a disk member 46 which has a pair of spaced arcuate openings 48 and 50 shown located in diametrically opposite positions inwardly from the edge of the disk 46. The purpose for the openings 48 and 50 will be explained hereinafter.

The shaft 44 is also connected to another annular member 52 which is located on the shaft so as to be positioned adjacent to the coils 26–38. The member 52 is shown as disk shaped and it has a pair of spaced permanent magnet members 54 and 56 mounted on or in it at spaced locations shown diametrically opposite to one another (see FIG. 2). The magnetic members 54 and 56 have their north and south poles oriented as shown in FIG. 2, that is with north poles shown on their lower sides and their south poles on the upper sides. This is done so that there will be mutual magnetic attraction and coupling between the magnets 54 and 56 and the fixed magnetic member 24. The polarity of the magnets 54 and 56 and/or of the magnet 24 can also be reversed if desired for some purposes to produce relative magnetic repulsion therebetween.

Referring again to FIG. 2, the lower plate member 40 is shown having a plurality of phototransistors 58–70 mounted on the upper surface thereof at spaced locations therearound. The number and locations of the phototransistors 58–70 are such as to be in alignment substantially with the centers of the respective coils 26–38 that are mounted on the member 24. A similar number of infrared emitters 72–84 are mounted on the undersurface of the member 42 in alignment with the respective phototransistors. There are seven infrared emitters 72–84 shown, each of which is in alignment with a respective one of the seven phototransistors 58–70 and a respective one of the seven coils 26–38. This arrangement is such that when the shaft 44 and the members attached thereto, including the disk 46 and the member 52, rotate relative to the other members including the member 24, the arcuate openings 48 and 50 will pass between the respective pairs of infrared emitters and in so doing will cause the phototransistors periodically to be in optical communication with the respective infrared emitters for predetermined time intervals. The purpose of this communication is to establish a sequence of energizing circuits to energize the respective coils 26–38, one at a time, so that each coil in turn will cause a momentary interruption of the magnetic interaction or a portion thereof between respective ones of the permanent magnets 54 and 56 and the magnet member 24.

When a coil is mounted on top of a permanent magnet such as permanent magnet 24 and energized it acts to concentrate the flux in a symmetrical magnetic field resulting in a non symmetrical field when another permanent magnet is placed above the coil that is located on the first permanent magnet 24. This will result in uneven or non-uniform forces being produced when the coil is energized causing a torque between the two permanent magnets, which torque will be in the direction to try to move one of the permanent magnets relative to the other.

Figure 3:
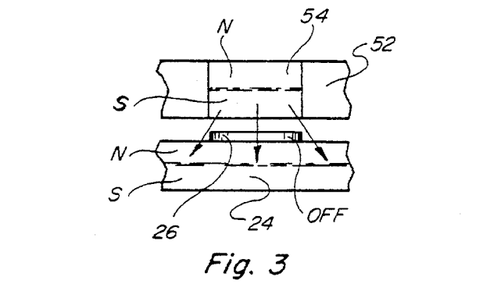
FIG. 3 is a fragmentary elevational view showing a relationship between one of the movable magnet members and the non-movable magnet member in one position of the device.

Referring to FIG. 3 there is shown the position of one of the magnet members 54 located immediately adjacent to one of the coils such as the coil 26. In this position there would be magnetic coupling between the magnets 54 and 24 so long as there is no voltage across the coil 26. However, if a voltage is placed across the coil 26 it will interrupt the magnetic coupling between the magnets 54 and 24 where the coil resides. This means that if there is any torque developed, it will be developed to either side of the coil 26. Without energizing the coil 26 there will be full attraction between the magnets 24 and 54 and no rotational force will be produced.

Figure 4:
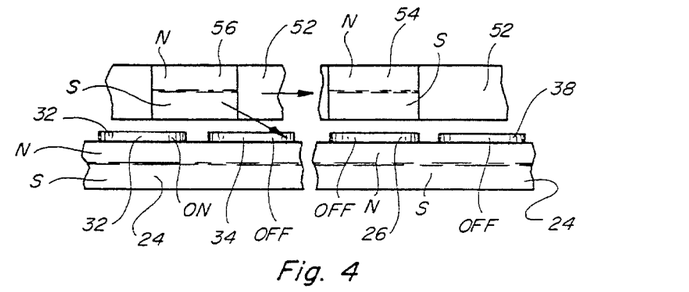
FIG. 4 is a view similar to FIG. 3 but showing the relationship between the other of the movable magnet members and the non-movable magnet member in the same position of the device.

Referring to FIG. 4 there is shown the relative positions of the movable magnets 54 and 56 for one position of the member 52. For example, the magnet 54 is shown located immediately above the coil 26 while the magnet 56 is shown straddling portions of the coils 32 and 34. If, in this position of the members, the coil 32 is energized but the coils 34 and 26 are not energized then the magnetic coupling between the magnet 56 and the magnet 24 will be oriented at an angle shown illustrated by the arrow in FIG. 4, and this attractive coupling will tend to move the member 52 to the right as shown in FIG. 4. Since there is no energizing of the coil 26 there will be full coupling between the magnet 54 and the member 24 but this will have no effect since it will neither be in a direction to rotate the member 52 or to stop it. At this same time the coil 38 which is the next coil over which the magnet 54 will move is likewise deenergized and will therefore have no effect to produce rotational moment of the member 52.

As the member 52 continues to rotate different ones of the coils 26–38 will be energized in sequence to continue producing magnetic coupling force between the members 52 and 24 in a direction to produce relative rotation therebetween. It is to be noted, however that all of the rotational force is produced by interaction between permanent magnet members and none of the rotational force is produced by the coils or by any other means. The coils are merely energized in sequence to control where the magnetic interaction occurs, and this is done in a manner to cause the member 52 to rotate. It should also be understood that one or more, including more than two, permanent magnets such as the permanent magnets 54 and 56 can be mounted on the rotating member 52, and the shape and size of the rotating member 52 can be adjusted accordingly to accommodate the number of permanent magnets mounted therein. Also, the member 52 can be constructed of a non magnetic material, the only requirement being that sufficient structure be provided to support the permanent magnets during rotation. This means that the member 52 need not necessarily be constructed to be round as shown in the drawing.

Figure 5:
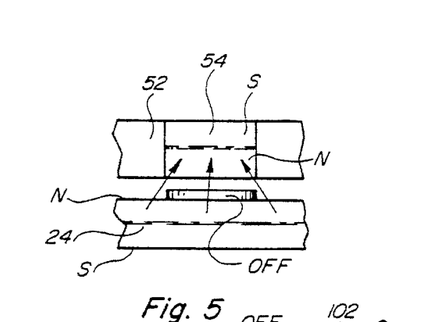
FIG. 5 is a fragmentary view similar to FIG. 3 but showing a repulsion interaction between the relatively movable permanent magnet members.
Figure 6:
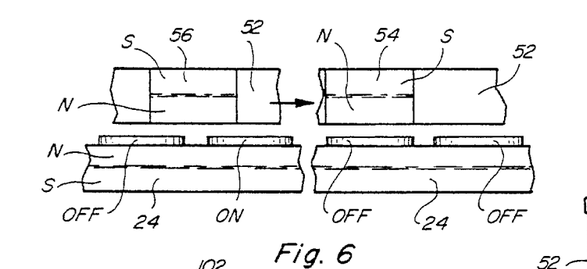
FIG. 6 is a view similar to FIG. 4 for the condition shown in FIG. 5.

FIGS. 5 and 6 are similar to FIGS. 3 and 4 but show a construction wherein the permanent magnets 54 and 56 are overturned so that instead of having their north poles adjacent to the member 24 they have their south poles adjacent to the magnet 24 but on the opposite side of the coils such as coils 26–38. The construction and operation of the modified device illustrated by FIGS. 5 and 6 is similar to that described above except that instead of producing magnetic attraction forces between the magnet members 54 and 56 and the magnet 24, magnetic repulsion forces are produced, and these repulsion forces can likewise be used in a similar manner to produce rotation of the member 52, whatever its construction.

Figure 7:
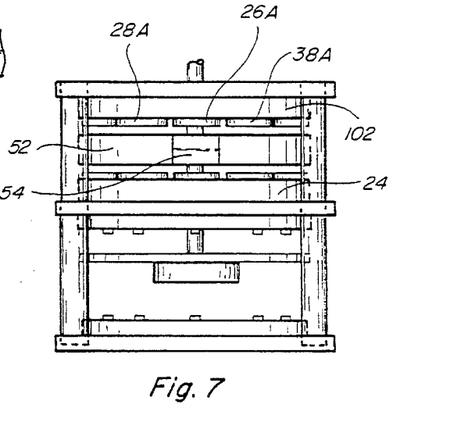
FIG. 7 is a side elevational view showing another embodiment of the subject device which is capable of producing even greater energy and torque.

FIG. 7 shows a modified embodiment 100 of the subject device which includes all of the elements shown in FIGS. 1 and 2 but in addition has a second stationary permanent magnet member 102 which is mounted above rather than below the member 52 and has its coil members such as coil members 26A–38A mounted on its underside. The magnetic member 102 operates with the magnets 54 and 56 similarly to the member 24 and can operate in precisely the same manner, that is by producing attraction force between the magnet members or by producing repulsion forces therebetween, each being used to produce relative rotational movement between the rotary portions of the device and the stationary portions. It is also contemplated to make the construction shown in FIG. 7 so as to produce attraction forces between the magnets 54 and 56 on one side thereof and cooperating repulsion forces which add to the rotation generating forces produced on the opposite sides thereof.

Figure 8:
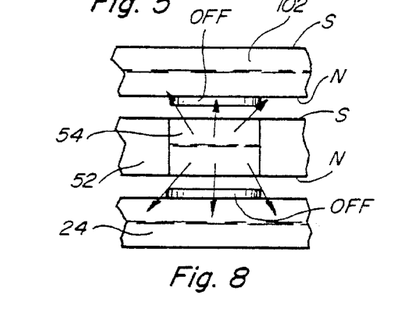
FIG. 8 is a fragmentary elevational view similar to FIG. 3 for the device of FIG. 7.
Figure 9:
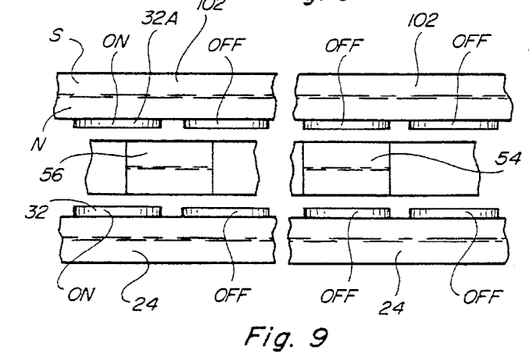
FIG. 9 is a view similar to FIG. 4 for the construction shown in FIG. 7.

FIGS. 8 and 9 are similar to FIGS. 3 and 4 but show the relationship between the magnets 54 and 56 and the members 24 and 102 located on opposite thereof. FIG. 9 shows arrows used to indicate the direction of the rotational forces produced that are necessary for rotating the rotatable portions of the device. These figures show one form of interaction between the rotating magnets 54 and 56 and the stationary magnets 24 and 102 located as shown in FIG. 7. In this construction the device produces attractive rotating force only.

Figure 10:
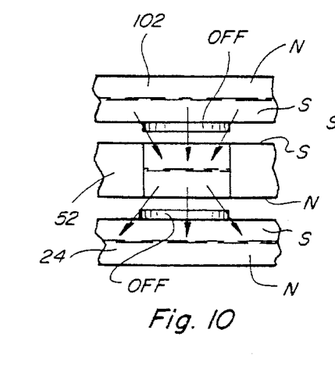
FIG. 10 is a view similar to FIG. 3 for the device shown in FIG. 7 but with the polarity of one of the fixed permanent magnet members reversed relative thereto.
Figure 11:
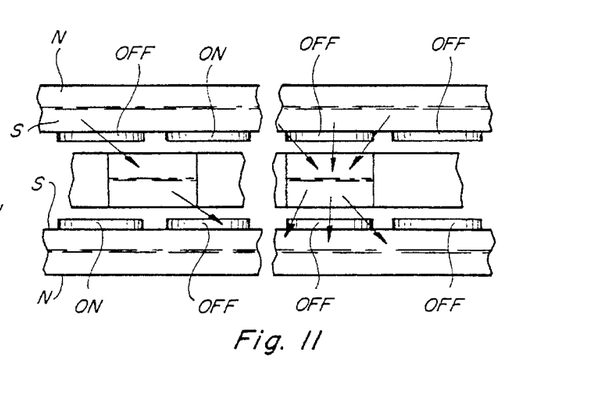
FIG. 11 is a fragmentary view similar to FIG. 4 for the device as shown in FIGS. 7 and 10.

FIGS. 10 and 11 are similar to FIGS. 8 and 9 except that in these figures both attraction and repulsion forces are shown being produced in association with the stationary magnets on opposite sides of the rotating magnets. Note also that the coils being energized on opposite sides of the member 52 are energized in a different arrangement.

Figures 12, 14:
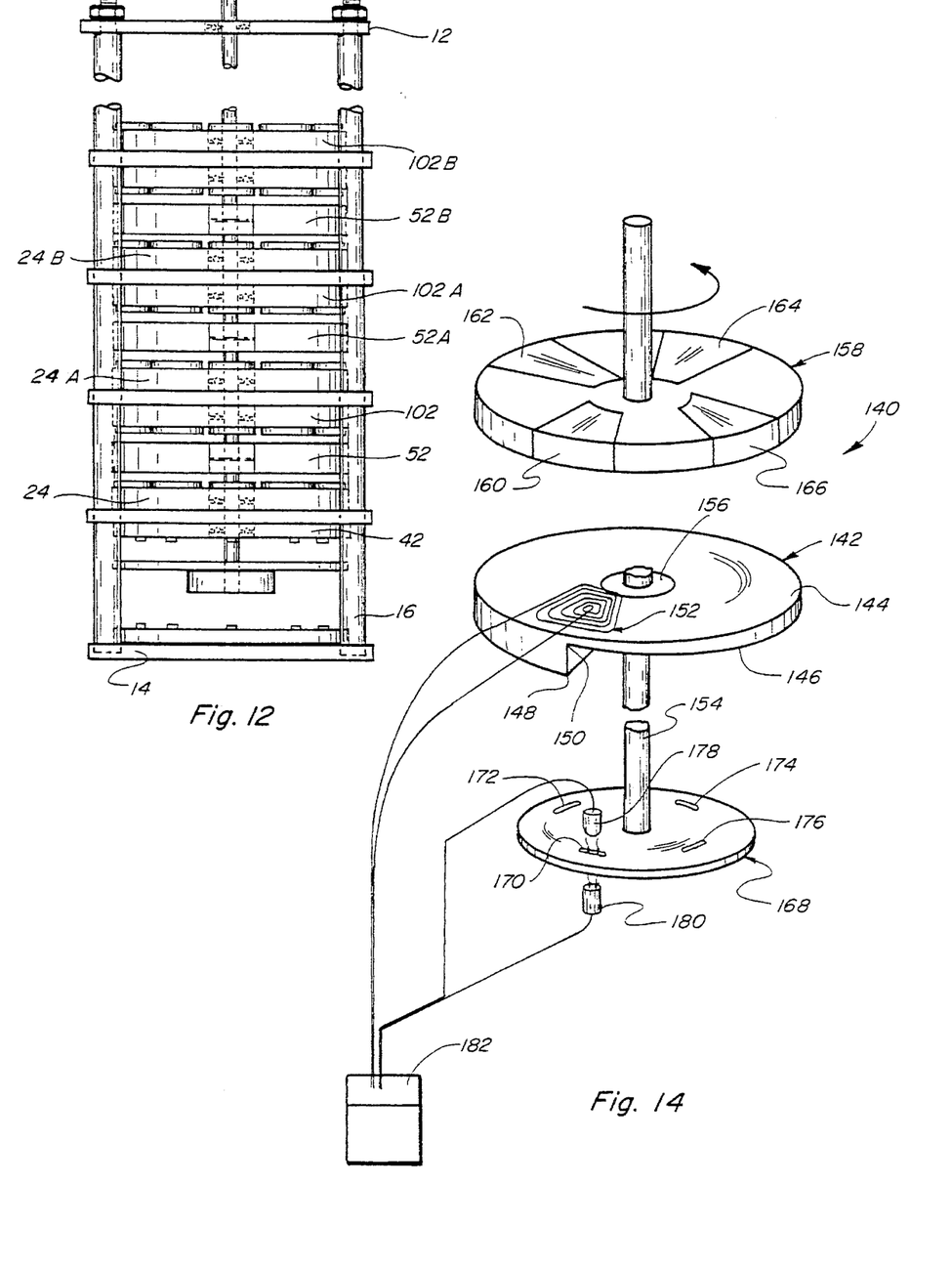
FIG. 12 is a side elevational view of another embodiment of the device.
FIG. 14 is a perspective view of another embodiment of the subject device.

FIG. 12 is a side elevational view similar to FIG. 7 but illustrating the way in which a plurality of stationary and rotatable magnetic members such as the members 24 and 102 can be mounted on the same shaft, in almost any number of repetitive groups to increase the amount of torque produced by the device. In FIG. 12 the same power source and the same circuit arrangement can be used to energize the phototransistors and the infrared emitters. However, depending upon whether attraction or repulsion forces are used to produce the rotation or some combination thereof will depend upon the order in which the coils associated with the stationary magnetic members are energized.

Figure 13:
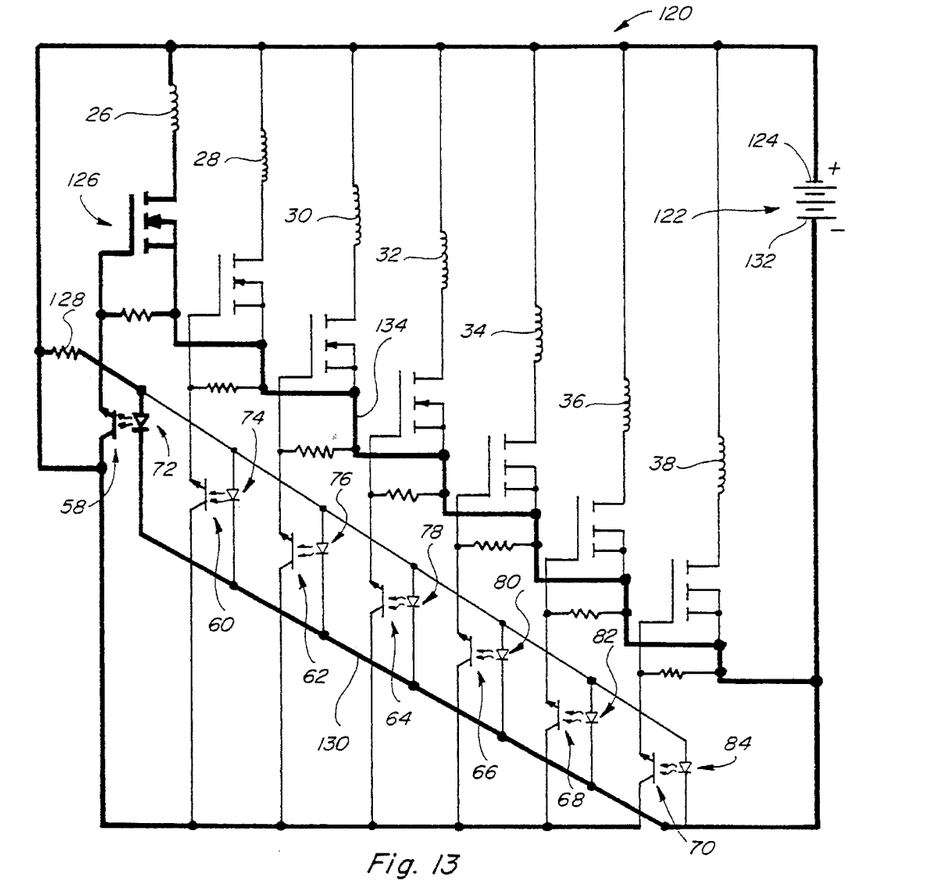
FIG. 13 is a schematic circuit diagram of the circuit for the devices of FIGS. 1, 7 and 12.

FIG. 13 is a circuit diagram for the device shown in FIGS. 1 and 2, showing the circuit connections for the coils 26–38 and for the circuit elements associated therewith. A similar circuit can be used for the construction shown in FIGS. 7 and 12. The circuit also includes connections to the various phototransistors and infrared emitters.

In FIG. 13, the circuit 120 is shown including a power supply 122 which may be a battery power supply, a rectified AC power supply or an AC or pulsed power supply. The positive side 124 of the power supply 122 is shown connected to one side of each of the coils 26–38, coil 26 and the circuits associated therewith being shown in bold outline and including connections to one side of a resistor 128 and to one side of the photo transistors 58–70. The opposite side of the coil 26 is connected to one terminal of Mosfet 126. The opposite side of the resistor 128 is connected to one side of the infrared emitter 72, as well as to the corresponding sides of all of the other infrared emitters 74–84. The opposite sides of the infrared emitters 72–84 are connected by lead 130 to the negative terminal side 132 of the power supply 122. With the circuit as shown, the infrared emitters 72–84 are all continuously energized and produce light which can be seen by the respective phototransistors 58–70 when one of the openings 48 or 50 passes therebetween. When this happens, the respective phototransistor 58 will conduct and in so doing will apply positive voltage on the associated Mosfet 126, turning the Mosfet on, and causing the voltage of the source 122 to also be applied across the coil 26. The circuit for this is from the source 122 through the coil 26, through the Mosfet 126 to and through the lead 134 to the opposite side of the source 122. When the supply voltage is applied across the coil 26, the coil 26 operates to limit or prevent magnetic communication between whichever one of the magnets 54 or 56 happens to be positioned adjacent to the coil 26 which is in the space between that magnet 54 or 56 and the magnet 24. This circuit is shown darkened in FIG. 13. By properly timing and controlling the application of voltage to the various coils 26–38 in the manner described, the magnetic coupling between the magnets 54 and 56 and the magnet 24 can be accurately controlled and in a manner to cause angular magnetic attraction between the magnet 54 (or 56) and the magnet 24, which angular attraction (or repulsion) is in a direction to cause rotation of the rotating parts of the structure shown in FIGS. 1, 2, 7 and 12. It is to be understood that each of the coils 26–38 will be controlled in the same manner, that is, will have a voltage appearing across it at the proper time to control the direction of the magnetic coupling in a manner to produce rotation. The rotating portions will continue to rotate and the speed of rotation can be maintained at any desired speed. Various means can be used to control the speed of rotation such as by controlling the timing of the DC or other voltage applied to the various coils, such as by using an alternating or pulsed current source instead of a direct current source or by loading the device to limit its rotational speed.

It is especially important to note that the energy required to operate the subject device is minimal since very little electrical energy is drawn when voltage is applied across the various coils when they are energized.

A well known equation used for conventional motor art, is:

$$\frac{\text{Speed} \times \text{Torque}}{9.55} = \text{Power (in watts). Hence,}$$

$$\frac{S \times T}{9.55} = W.$$

This equation has limited application to the present device because in the present device the torque is believed to be constant while the speed is the variable. The same equation can be rewritten:

$$T = \frac{9.55 \times W}{S} \text{ or } S = \frac{9.55 \times W}{T}$$

These equations, if applicable mean that as the speed increases, the watts divided by the torque must also increase but by a factor of 9.55. Thus if torque is constant or nearly constant, as speed increases, the power output must increase and at a very rapid rate.

It should be understood that the present device can be made to have any number of stationary and rotating magnets arranged in stacked relationship to increase the power output, (see FIG. 12) and it is also possible to use any desired number of coils mounted on the various stationary magnets. In the constructions shown in FIGS. 1, 7, and 12 seven coils are shown mounted on each of the stationary magnets but more or fewer coils could be used on each of stationary magnet depending upon the power and other requirements of the device. If the number of coils is changed the number of light sources and photodetectors or transistors will change accordingly. It is also important to note that the timing of the turning on of the various phototransistors is important. The timing should be such as that illustrated in FIG. 4, for example, when one of the coils such as coil 32 is energized to prevent coupling in one direction between the magnet 56 and the magnet 24 the adjacent coil 34 will not be energized. The reasons for this have already been explained.

Referring to FIG. 14, there is shown another embodiment 140 of the subject device. The embodiment 140 includes a stationary permanent magnet 142 which has a flat upper surface 144 and a lower surface 146 that is circumferentially helical so that the member 142 varies in thickness from a location of maximum thickness at 148 to a location of minimum thickness at 150. The thickness of the member 142 is shown varying uniformly therearound. Near the location of the thickest portion 148 of the permanent magnet 142 and adjacent to the surface 144 is an air coil 152 shown formed by a plurality of windings. A shaft member 154 is journalled by bearing means 156 for rotation relative to the stationary permanent magnet 142 and is connected to a rotating member 158. The member is shown annular in shape and includes four spaced permanent magnets 160, 162, 164 and 166 mounted on or in it. The permanent magnets 160–166 are positioned to rotate in closely spaced relation to the stationary permanent magnet 142 but with the coil 152 positioned therebetween. The coil 152 is connected into a circuit similar to that shown in FIG. 13 and the circuit will not be described further.

The principals of operation of the device 140 shown in FIG. 14 are similar to that described above in connection with FIGS. 1 and other figures. It is important to note, however, that the permanent magnets 160–166 rotate relative to the permanent magnet 142 because of the increasing coupling between them and the permanent magnet due to the increasing peripheral thickness of the permanent magnet. Thus the member 158 will rotate in a counterclockwise direction as shown, and each time one of the magnets 160–166 moves into a position adjacent to the thickest portion 148 of the fixed permanent magnet 142 the coil 152 will have voltage applied across it, otherwise there would be a tendency for the member 158 to stop or reduce the rotational force. In order to overcome this the coil 152 is energized each time one of the permanent magnets 160–166 is in the position shown. The rotating disc 158 is connected through the shaft 154 to rotating disc 168 which has four openings 170, 172, 174 and 176 corresponding to the locations of the permanent magnets 160–166 so that each time one of the permanent magnets moves to a position adjacent to the thickest portion 148 of the stationary permanent magnet 142 the coil 152 will be energized and this will reduce or eliminate the coupling between the rotating and stationary magnets that would otherwise slow the rotating portions down. The circuit connected to the coil 152 includes the same basic elements described above in connection with FIG. 13 including varying a photocell 178, an infrared emitter 180 and a Mosfet 182 connected into a circuit such as that shown in FIG. 13. The timing of the energizing of the coil 152 is important and should be such that the coil will be energized as the respective permanent magnets 160–166 move to a position in alignment or substantial alignment with the thickened portion 148 of the stationary permanent magnet 142.

Figure 15:
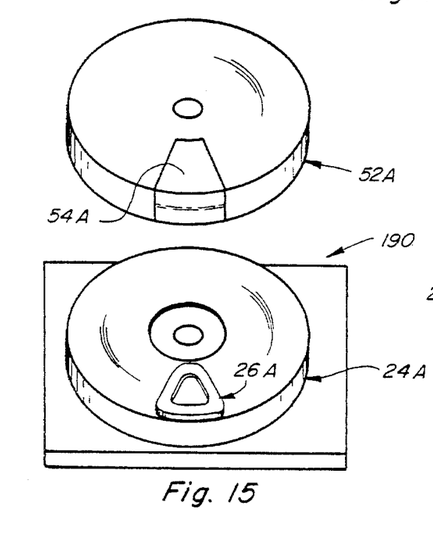
FIG. 15 is a simplified embodiment of the device showing the use of one rotating magnetic member and one coil positioned in the plane between the rotating and stationary magnetic members.

FIG. 15 shows a basic simplified form 190 of the present device which includes a rotary member 52A having a single permanent magnet portion 54A mounted thereon. The device also has a stationary permanent magnet 24A with a single air coil 26A positioned in the space between the members 52A and 24A in the manner already described. The construction 190 is not self-starting as are the preferred embodiments such as embodiment 10 but the rotary portions will rotate continuously once the device is started as by manually rotating the rotary portions. The construction 190 will have other portions as described above but the output from the construction will be less than the output produced by the other constructions.

Figure 16:
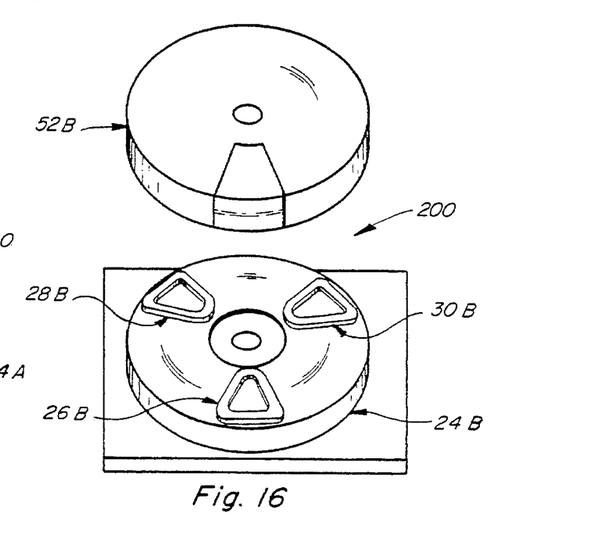
FIG. 16 is a simplified embodiment of the device showing use of one movable magnetic member and three coils arranged to be in a plane between the rotating and stationary magnets.

FIG. 16 shows another simplified version 200 of the device wherein the member 52B is similar to the corresponding rotatable member 52A shown in FIG. 15. However, the fixed structure including the permanent magnet 24B has three windings 26B, 28B and 30B located at spaced intervals adjacent to the upper surface thereof. The construction shown in FIG. 16 will produce more output than the construction shown in FIG. 15 but less than that of the other constructions such as that shown in FIGS. 1, 2, 7 and 12. Obviously many other variations of the constructions shown in the application are also possible including constructions having more or fewer coils, more or fewer rotating magnetic portions, more or fewer rotary members such as the member 52 and more or fewer stationary members such as the members 24 and 142.

FIGS. 17–25 illustrate some of the underline principles of the present invention.

Figure 17:
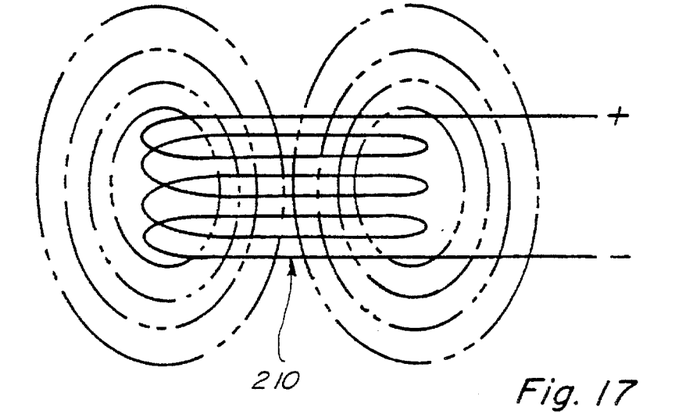
FIG. 17 is a side elevational view of an air coil with a voltage applied thereacross and showing in dotted outline the field of the coil.

FIGS. 17 shows an air coil 210, positioned in space, with an electric potential applied thereacross. With the energizing voltage applied the electro-magnetic field of the air coil 210 extends substantially equally in the space above and below the coil as shown in dotted outlined.

Figure 18:
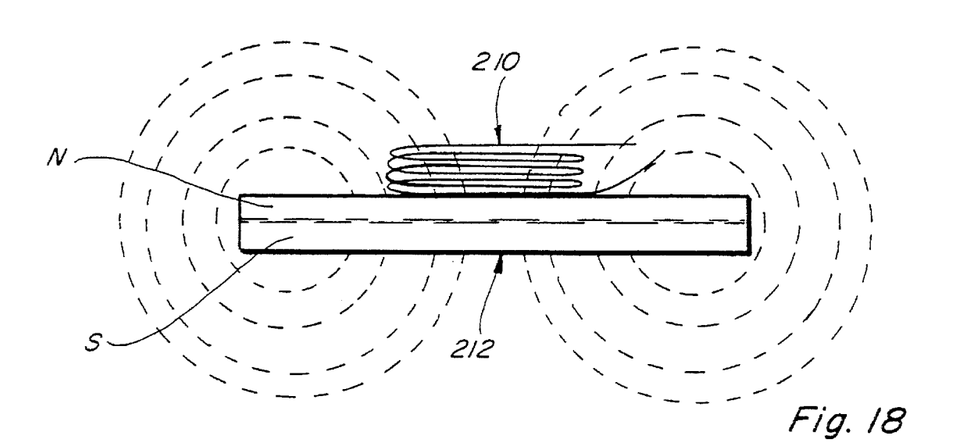
FIG. 18 is a view similar to FIG. 17 but showing the air coil positioned adjacent to one side of a permanent magnet showing in dotted outline the magnetic field of the permanent magnet with no electric potential applied across the air coil.

FIG. 18 shows the air coil 210 positioned adjacent to one side (the north side) of permanent magnet 212. In FIG. 18 no voltage is applied across the air coil 210 and therefore the air coil 210 does not produce an electro-magnetic field as in FIG. 17. Under these circumstances the air coil 210 has no effect on the magnetic field of the permanent magnet 212 and the field of the permanent magnet is substantially as shown by the dotted outlines in FIG. 18.

Figure 19:
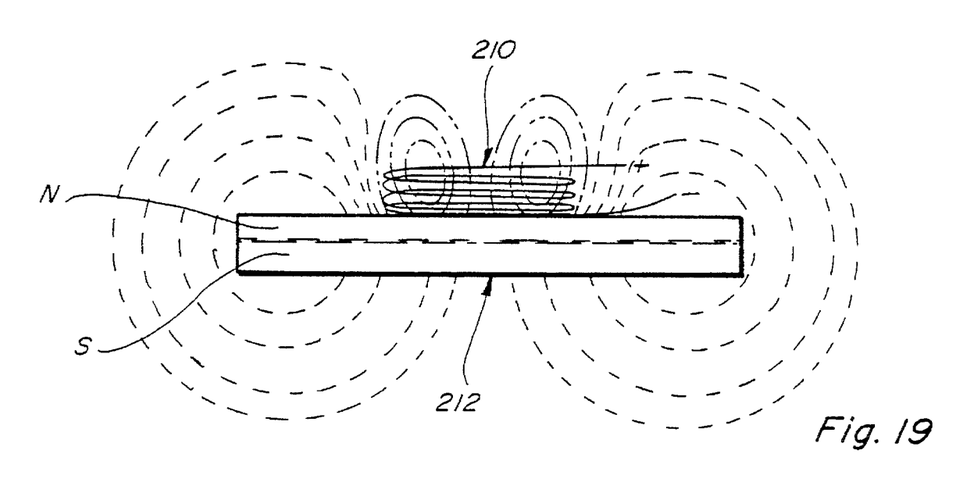
FIG. 19 is a side elevational view similar to FIG. 18 with an electric potential applied across the air coil, said view showing in dotted outline the shapes of the electric field of the air coil and the magnetic field of the permanent magnet.

FIG. 19 is similar to FIG. 18 except that in FIG. 19 the air coil 210 has an electric potential applied across it and therefore has an established electro-magnetic field shown again by dotted outline.

The electro-magnetic field of the air coil 210 modifies the magnetic field of the permanent magnet 212 in the manner shown. If the coil 210 is placed in contact with or close to the surface of the permanent magnet and it is energized so that its polarity is opposite to that of the permanent magnet then the field produced is similar to that shown in FIG. 19. Note that the field of the air coil 210 and the field of the permanent magnet 212 directly beneath the air coil 210 are in opposition and therefore act to cancel one another. The air coil 210 would be defined to produce a counter magnetomotive force which acts to cancel the field of the permanent magnet 212 in the region where the air coil 210 exists and the amount of the field in that region of the permanent magnet 212 that is canceled is the remainder of the difference in magnetomotive force between the region of the permanent magnet 212 and the counter magnetomotive force of the air coil 210. Note that since the field of permanent magnet 212 is only altered in the region of the air coil 210, the geometric magnetic field characteristics of the permanent magnet 212 can be altered selectively based upon the size of the coil 210, the number of air coils 210 and the amount of counter magnetomotive force being produced by the air coil 210.

Figure 20:
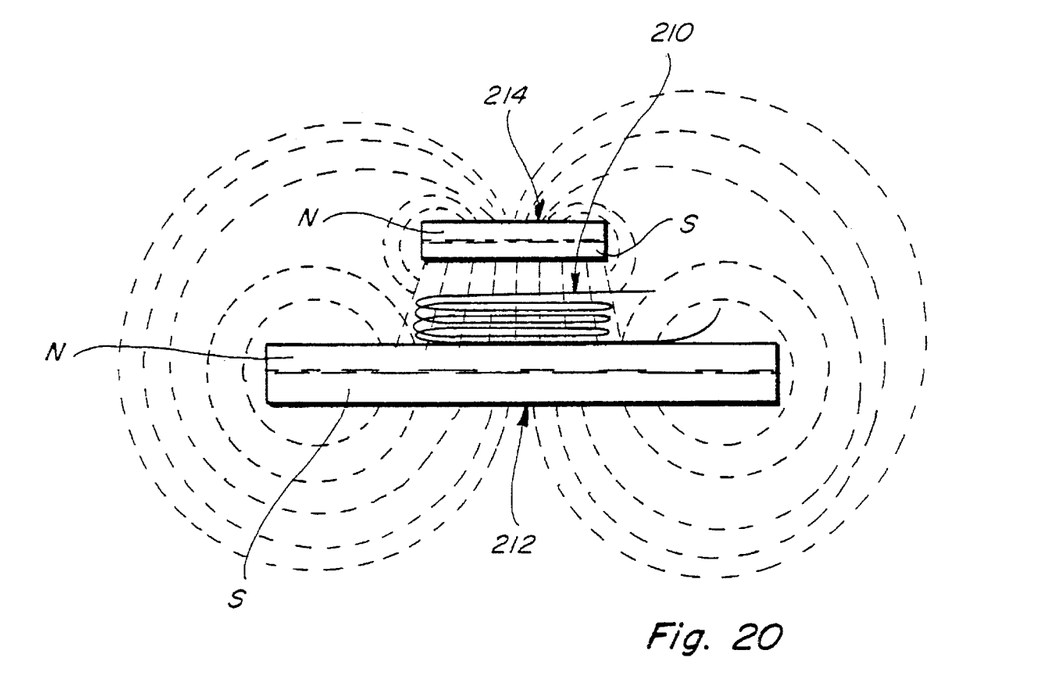
FIG. 20 is a side elevational view similar to FIG. 19 but showing a second permanent magnet spaced above first permanent magnet and showing in dotted outline the magnetic fields of the two permanent magnets when no electric potential is connected across the air coil.

FIG. 20 is similar to FIG. 19 except that a second permanent magnet 214 is positioned at a location spaced above the air coil 210. In FIG. 20 no voltage is applied across the air coil 210 and therefore the air coil 210 does not have an electro-magnetic field. Thus FIG. 20 shows only the combined affect of the fields of the permanent magnets 212 and 214. Since the permanent magnets 212 and 214 are oriented so that their respective north and south poles are close together, there will be a strong attractive force between them at the location of the air coil 210.

Figure 21:
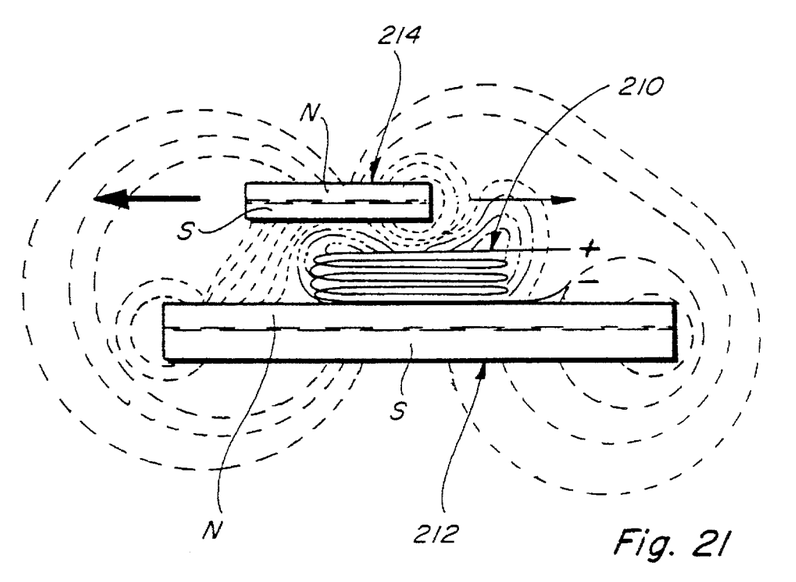
FIG. 21 is a view similar to FIG. 20 but with the permanent magnets in an different relative position and with a voltage applied across the air coil, said view showing the shapes of the electro-magnetic field of the air coil and the modified shapes of the magnetic fields of the two permanent magnets.

FIG. 21 is a view similar FIG. 20 but with an electric potential applied across the air coil 210 and with the upper permanent magnet 214 displaced to the left relative to its position in FIG. 20. Note that in FIG. 21 the shape of the electro-magnetic field of the air coil 210 is concentrated and shifted somewhat to the right and upward. This shift of the electro-magnetic field concentrates the magnetic coupling between the magnets 212 and 214 to the left thereby increasing the tendency of the upper permanent magnet 214 to move to the left. A much smaller magnetic coupling occurs between the right end of the permanent magnets 212 and 214 and thus the force tending to move the permanent magnet 214 to the right is much less than the force tending to move it to the left. This is illustrated by the size of the arrows shown in FIG. 21.

Figure 22:
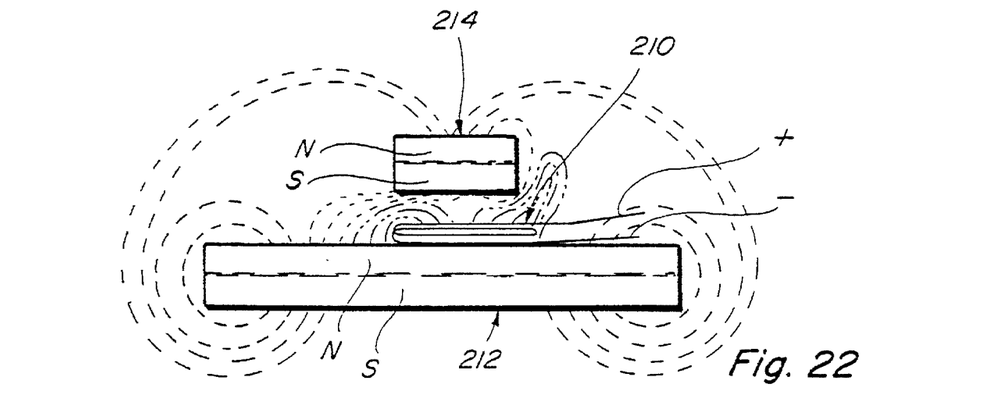
FIGS. 22–25 are similar to FIG. 21 and show the electromagnetic field of the air coil and the magnetic fields of the magnets in four different relative positions of the permanent magnets.
Figure 23:
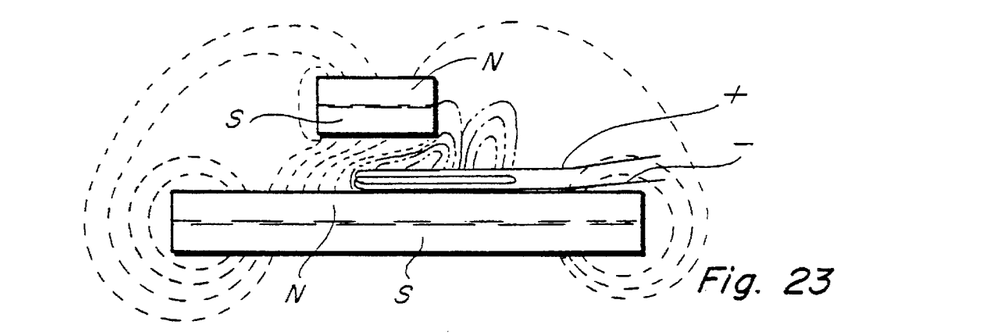
Figure 24:
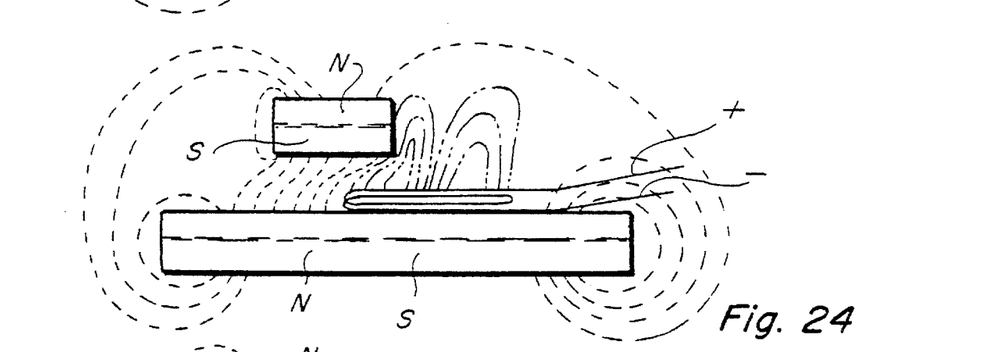
Figure 25:
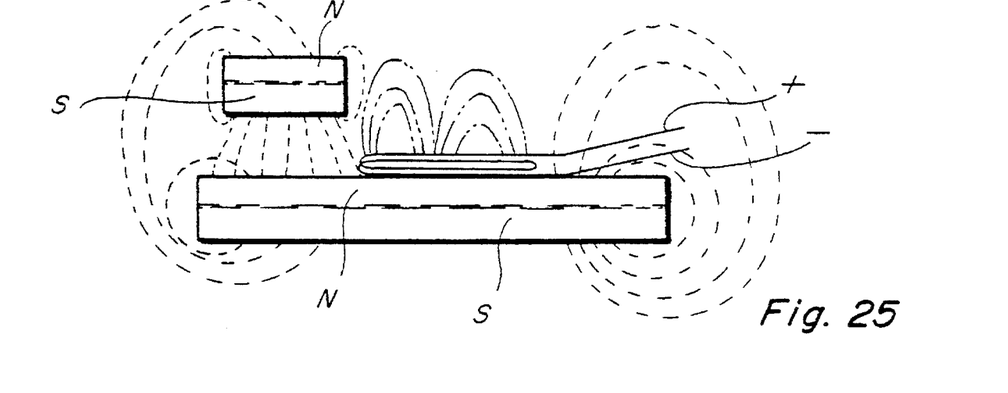

FIGS. 22–25 show four different positions of the upper permanent magnet 214 relative to the lower permanent magnet 212. In FIG. 22 because of the position of the upper permanent magnet 214 relative to the air coil 210 there is a concentration of the magnetic coupling force tending to move the upper permanent magnet 214 to the left. This force increases in FIGS. 23 and 24 until the upper permanent magnet 214 reaches the position shown in FIG. 25 where all of the magnetic coupling is directed substantially vertically between the permanent magnets 212 and 214 and in this position there is little or no torque as a result of coupling energy between the permanent magnets 212 and 214 tending to move them relative to one another.

The principles illustrated in FIGS. 17–25 are at the heart of the present invention and explain where the energy comes from to produce relative movement between the relatively moveable permanent magnets.

The present device has application for very many different purposes and applications including almost any purpose where a motor or engine drive is required and where the amount of energy available and/or required to produce the driving force may vary little to nil. Applicant has produced devices of the type described herein capable of rotating at very high speed in the order of magnitude of 20,000 RPMs and with substantial torque. Other lesser speeds can also be produced, and the subject device can be made to be self starting as is true of the constructions shown in FIGS. 1, 2, 7 and 12. Because of the low power required to operate the device applicant has been able to operate same using a commerically available battery such as a nine volt battery.

Thus there has been shown and described a novel magnetic motor or motor-like construction which fulfills all of the objects and advantages sought therefor. It will be apparent to those skilled in the art, however, that many changes, variations, modifications and other uses in applications for the subject device are possible. All such changes, variations, modifications and other uses in applications which do not depart from the spirit and scope of the invention are deemed to be covered by the invention which is limited only by the claims which follow.

What is claimed is:

1. A device to control the magnetic interaction between spaced permanent magnets comprising:

a first permanent magnet having opposite surfaces with north and south poles respectively, a second permanent magnet spaced from and movable relative to the first permanent magnet and having opposite surfaces with north and south poles respectively, one of which is positioned in close enough proximity to one of the surfaces of the first permanent magnet to produce magnetic interaction therebetween, a coil of conductive metal positioned in the space between the first and second permanent magnets, a source of electrical energy and switch means connected in series therewith across the coil whereby when the switch means are closed the electrical energy from said source is applied across the coil whereby the magnetic interaction between the first and second permanent magnets is changed, and means to control the opening and closing of the switch means.

2. A device for producing rotational movement and torque comprising:

a member journaled for rotational movement about an axis of rotation, the rotatable member having at least a portion adjacent the periphery thereof formed of a permanently magnetized material, a stationary member formed of permanently magnetized material mounted adjacent to the peripheral portion of the rotatable member axially spaced therefrom whereby a magnetic interaction is produced between the stationary and the rotatable members in predetermined positions of the rotatable member, at least one coil positioned extending into the space between the stationary and rotatable members, means including a source of electric potential and switch means connected in series across the coil, and means to predeterminately control the opening and closing of the switch means during rotation of the rotatable member to vary the magnetic interaction in a way to produce rotation of the rotatable member.

3. Means to predeterminately vary the magnetic interaction between first and second spaced permanent magnet members comprising a first permanent magnet member having north and south poles, a second permanent magnet member having north and south poles spaced from the first permanent magnet member by a gap therebetween, a coil positioned extending into the gap between the first and second permanent magnet members, means connecting the coil across a circuit that includes a source of voltage and switch means connected in series therewith so that when the voltage source is connected across the coil it effects the magnetic interaction between the first and second permanent magnet members, and means for mounting the first permanent magnet member for movement relative to the second permanent magnet member and relative to the coil in the gap therebetween.

4. The device of claim 3 wherein the first and second permanent magnet members are mounted to produce magnetic attraction therebetween.

5. The device of claim 3 wherein the first and second permanent magnet members are mounted to produce magnetic repulsion therebetween.

6. The device of claim 3 wherein the means mounting the first permanent magnet member includes means mounting the first permanent magnet member for rotational movement relative to the second permanent magnet member and the switch means includes cooperative optical means having a first portion mounted for movement with the first permanent magnet member and a second portion associated with the second permanent magnet member.

7. The device of claim 6 wherein the switch means includes a light source and a light sensitive member associated respectively with the first and second permanent magnet members, and control means therefor mounted for movement with the first permanent magnet.

8. The device of claim 3 wherein the second permanent magnet member is an annular permanent magnet member having one of its poles on one side of the gap and the other of its poles opposite thereto, means mounting the first permanent magnet member for rotational movement relative to the second permanent magnet member, said first permanent magnet member having one of its poles on one side of the gap, and a plurality of circumferentially spaced coils mounted in the gap between the first and second permanent magnet members.

9. The device of claim 8 wherein the first permanent magnet member includes two circumferentially spaced portions.

10. Means for producing rotational movement comprising:

a support structure having a first permanent magnet mounted thereon, said first permanent magnet having a north pole adjacent one surface and a south pole adjacent to the opposite surface, means for mounting a second permanent magnet for rotational movement in a plane parallel to the first permanent magnet, the second permanent magnet occupying an arcuate portion of said mounting means less than the entire circumference of said mounting means and having a north pole adjacent to the opposite surface and positioned so that there is a magnetic interaction between the spaced first and second permanent magnets across a gap therebetween in at least one position thereof, at least one air coil positioned in the gap between the first and second permanent magnets, a source of electric potential and switch means for controlling the application of the electric potential from said source across the air coil, the application of voltage across the air coil effecting the magnetic interaction between the first and second permanent magnet members in certain positions of the second permanent magnet relative to the first permanent magnet and in such a manner as to produce rotational movement of the second permanent magnet.

11. The device for producing rotational movement of claim 10 wherein a third permanent magnet is mounted on the support structure on the opposite side of the second permanent magnet from the first permanent magnet so as to establish a second gap therebetween and so that there is magnetic interaction between the second and third permanent magnets, and at least one second coil mounted in the gap between the second and third permanent magnets to predeterminately effect the magnetic interaction therebetween in certain positions of the second permanent magnet relative to the third permanent magnet thereby to contribute to the production of rotational movement of the second permanent magnet member relative to the first and third permanent magnets.

12. The device for producing rotational movement defined in claim 11 wherein the switch means for applying voltage from the source across the coils includes a light source and light sensor one mounted on the support structure and the other on the rotatable means to produce a switching action to apply and remove voltage from across the coils in predetermined positions of the second permanent magnet relative to the first and third permanent magnets.

13. Means for producing rotary motion using magnetic energy from permanent magnets comprising:

a fixed permanent magnet having opposite surfaces with north and south poles respectively adjacent thereto, a shaft having an axis and means journaling the shaft for rotation in a position extending normal to the opposite surfaces of the fixed permanent magnet, a movable permanent magnet and means mounting the movable permanent magnet on the shaft for rotation therewith, the movable permanent magnet occupying an arcuate portion of said mounting means less than the entire circumference of said mounting means and having opposite surfaces with associated north and south poles respectively, one pole of said movable permanent magnet being positioned to move in close enough proximity to one of the opposite surfaces of the fixed permanent magnet to produce magnetic interaction therebetween, at least one coil mounted in the space between the fixed permanent magnet and the movable permanent magnet, energizing of the coil effecting the magnetic interaction between the fixed and the movable permanent magnets when positioned therebetween, and means connecting the coil to a source of energizing potential in selected positions of the movable permanent magnet relative to the fixed permanent magnet.

14. The device for producing rotary motion of claim 13 wherein a plurality of coils are mounted in a coplanar relationship in the space between the fixed permanent magnet and the movable permanent magnet, the means connecting the coils to a source of energizing potential including means for energizing the respective coils in a predetermined sequence.

15. The device for producing rotary motion of claim 13 including a second movable permanent magnet mounted on the means mounting the movable permanent magnet for movement therewith, said second movable permanent magnet being spaced circumferentially from the aforesaid movable permanent magnet.

16. The device for producing rotary motion of claim 13 wherein a second fixed permanent magnet has opposite surfaces with north and south poles respectively adjacent thereto and is mounted on the opposite side of the movable permanent magnet from the aforesaid fixed permanent magnet and at least one coil mounted in the space between the second fixed permanent magnet, and the movable permanent magnet.

17. A device for producing rotary motion defined in claim 13 wherein the means connecting the coil to a source of energizing potential includes a fixed light source and a fixed light sensitive member mounted in spaced relationship and means on the mounting means for the movable permanent magnet for predeterminately controlling communication between the light source and the light sensitive member during rotation of the movable permanent magnet.

18. A magnetic motor-like device comprising:

a fixed support structure having a permanent magnet member mounted thereon, said member having opposite side faces with a north magnetic pole adjacent one side face and a south magnetic pole adjacent the opposite side face, a plurality of coils mounted adjacent to and arranged about one of the opposite side faces, an orifice through the permanent magnet member at a location intermediate the coils, a shaft extending through the orifice for rotation about the axis thereof, a member attached to the shaft for rotation therewith and spaced from the one opposite magnet side faces, at least one magnet member attached to a segment of said rotating member for rotation therewith, each of said rotating magnetic members having a magnetic pole face positioned in spaced relation to the one opposite pole side face of the fixed permanent magnet member, the plurality of coils being in the space formed by and between the fixed permanent magnet member and the at least one rotatable magnet member, and means to selectively and sequentially energize the coils as the shaft rotates to predeterminately control the magnetic interaction between the at least one magnetic member and that fixed permanent magnet member.

19. The magnetic device of claim 18 wherein there is an odd number of coils mounted in the space between the permanent magnet member and the at least one rotatable magnetic member.

20. The magnetic device of claim 18 wherein the at least one magnetic member attached to the rotating member for rotation therewith includes two circumferentially spaced rotatable magnet portions.

21. A device for producing rotary motion comprising:

a support structure having a wall member, a shaft and means journaling the shaft for rotation in the wall member about its axis, a permanent magnet member mounted on the wall member extending about at least a portion of the shaft, said permanent magnet member having one pole adjacent to the wall member and an opposite pole spaced therefrom, a member mounted on the shaft having at least two magnetic members oriented to produce magnetic interaction with the permanent magnet member, a plurality of coils mounted in coplanar relation extending into the space formed by and between the permanent magnet member and the at least two magnetic members and means to sequentially apply a voltage across the respective coils to vary the magnetic interaction between the permanent magnet member mounted on the wall member and selected ones of the at least two magnetic members.

22. A device for producing rotary motion using magnetic energy from permanent magnets comprising a fixed permanent magnet having opposite surfaces with north and south poles respectively adjacent thereto, a shaft and means for journaling the shaft for rotation extending normal to the opposite surfaces of the fixed permanent magnet, at least two rotatable permanent magnets and means mounting them for rotation with the shaft, the rotatable permanent magnets having opposite surfaces with associated north and south poles respectively, one pole of each rotatable permanent magnet being positioned close enough to one of the opposite surfaces of the fixed permanent magnet to produce magnetic interaction therebetween, a plurality of spaced coils arranged to be coplanar and positioned in the space formed by and between the fixed permanent magnet and the rotatable permanent magnets, and means to apply a voltage across respective ones of the coils in a sequence so as to predeterminately affect the interaction between the fixed permanent magnet and the rotatable permanent magnets in a manner to produce rotation of the at least two permanent magnets.

23. A device for producing rotary motion using magnetic energy from permanent magnets comprising:

a fixed annular permanent magnet having a flat surface on one side and an opposite surface of helical shape extending therearound from a location of minimum thickness to a location of maximum thickness approximately adjacent thereto, the annular permanent magnet having one of its poles adjacent to the flat surface and its opposite pole adjacent to the helical opposite surface, a shaft and means for journaling the shaft for rotation extending substantially normal to the flat surface of the fixed permanent magnet, a permanent magnet and means mounting it on the shaft for rotation therewith, said permanent magnet having opposite pole faces and being positioned so that there is magnetic interaction between said permanent magnet and the fixed annular permanent magnet, at least one air coil positioned in the space between the fixed and rotatable permanent magnets, and means to apply a voltage across the air coil when the rotatable permanent magnet is adjacent to the thickest portion of the fixed permanent magnet to change the magnetic interaction therebetween, said last name means including a source of voltage and switch means in series with the source for controlling the application of voltage across the air coil.

24. The device for producing rotary motion of claim 23 wherein a plurality of rotatable permanent magnets are mounted at circumferentially spaced locations about the shaft for magnetic interaction with the fixed annular permanent magnet, the switch means controlling the application of voltage from the source to the air coil when one of the rotatable permanent magnets is positioned adjacent to the thickest portion of the fixed annular permanent magnet.

25. The means for producing rotary motion of claim 23 wherein the switch means includes cooperative optical means having a first portion associated with the fixed annular permanent magnet and a second portion associated with the rotatable annular permanent magnet.

* * * * *